United States Patent

Shinohara et al.

[11] Patent Number: 5,425,804
[45] Date of Patent: Jun. 20, 1995

[54] WATER-REPELLENT GLAZING AGENT

[75] Inventors: Seigo Shinohara, Chigasaki; Kiyoshi Okamura, Fujisawa; Tetsuo Kijima, Machida, all of Japan

[73] Assignee: Taiho Industries Co., Ltd., Tokyo, Japan

[21] Appl. No.: 155,926

[22] Filed: Nov. 23, 1993

[51] Int. Cl.$^6$ ............................................. C08L 83/04
[52] U.S. Cl. ...................... 106/2; 106/287.14; 106/271; 523/169; 524/277; 524/267; 252/312; 252/308
[58] Field of Search ................... 106/2, 287.14, 271; 523/169; 524/277, 267; 252/312, 308, 49.6

[56] References Cited

U.S. PATENT DOCUMENTS

| | | | |
|---|---|---|---|
| 3,445,389 | 5/1969 | McKellar et al. | 252/49.6 |
| 3,929,492 | 12/1975 | Chapman et al. | 106/287.14 |
| 4,347,333 | 8/1982 | Lohr et al. | 524/267 |
| 4,652,386 | 3/1987 | Alberts et al. | 252/49.6 |
| 4,741,773 | 5/1988 | Kuroda et al. | 106/2 |

FOREIGN PATENT DOCUMENTS 337378  11/1992  Japan ................................. 524/268

*Primary Examiner*—Mark L. Bell
*Assistant Examiner*—C. M. Bonner
*Attorney, Agent, or Firm*—Browdy and Neimark

[57] ABSTRACT

A novel water-repellent glazing agent is disclosed. The agent contains a modified organic silicone oil, which is represented by the general formula

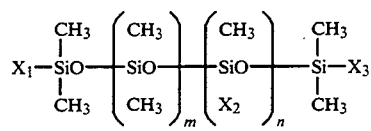

wherein $X^1$, $X^2$ and $X^3$ respectively stand for $CH_3$ or a long chain alkyl group having 10–30 carbon atoms and at least one of $X^1$, $X^2$ and $X^3$ is a long chain alkyl group having 10–30 carbon atoms and m and n are respectively 20–80 and 3–10. This agent has excellent water repellency and glazing effect as well as excellent operability.

6 Claims, No Drawings

WATER-REPELLENT GLAZING AGENT

BACKGROUND OF THE INVENTION

1. Field of the Invention

The present invention relates to a water-repellent glazing agent, more particularly, to an excellent water-repellent glazing agent, which is suitable for treatment or polishing of the coated surface of automobiles and the surface of plastic, rubber, glass, etc.

2. Prior Art and the Object of the Invention

As water-repellent glazing agents for the coated surface of automobiles, etc., conventionally there have been used solvent type agents comprising a solution of a natural or synthetic wax such as carnauba wax, montan wax, paraffin wax, micro wax, polyethylene wax or the like and silicone oil in a solvent, or emulsion type agents comprising an emulsion which is formed by emulsifying the former with an emulsifying agent and water.

Of these, however, the solvent type agents are difficult to wipe off after application although they are excellent in water repellency. The emulsion type agents are rather poor in water repellency although they are easy to use. This invention was made under the circumstances in order to improve the above-described deficiency of the conventional products. That is, the object of the present invention is to provide a water repellent glazing agent or auto polish having well-balanced improved glazing and water repellent effects and is easy to use having an excellent wipe-off property.

SUMMARY OF THE INVENTION

In order to achieve the above-described object, this invention provides a water-repellent glazing agent comprising a solution or a dispersion of a modified organic silicone oil, some of whose side chains are substituted with long chain alkyl groups, in at least one solvent selected from hydrocarbon solvents, volatile silicone solvents and chlorohydrocarbon solvents.

DISCLOSURE OF THE INVENTION

Now the invention will be specifically described in detail.

Water-Repellent Glazing Agent

The water repellent glazing agent of the present invention comprises a modified organic silicone oil, some of whose side chains are substituted with long chain alkyl groups, a specific solvent and an additional ingredient or ingredients optionally added.

A. Modified Organic Silicones

The modified organic silicone oil used in the present invention is a silicone oil, some of whose side chain are substituted with long chain alkyl groups. Said modified organic silicone oil is represented by the chemical formula:

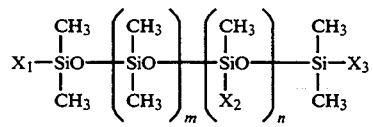

wherein $X^1$, $X^2$ and $X^3$ respectively stand for $CH_3$ or a long chain alkyl group having 10–30 carbon atoms and at least one of $X^1$, $X^2$ and $X^3$ is a long chain alkyl group having 10–30 carbon atoms, m is an integer of 20–80 and n is an integer of 3–10. The content of the modified organic silicone in the water-repellent glazing agent of this invention is 0.5–20 wt %, preferably 1–5 wt %. With less than 0.5 wt % of the silicone oil, glazing and water repellent effect are not sufficient and with more than 20 wt % of the silicone oil, a thick oil film remains after the solvent vaporizes from the applied agent and thus troublesome wiping-off work is required in order to thinly and uniformly spread the oil. Moreover, the glazing effect might be impaired.

These modified silicones are commercially available from Goyo Paper Working Co., Ltd., Osaka, Japan, for instance.

B. Solvents

The solvents used in the present invention can be selected from hydrocarbon solvents, silicone solvents and chlorohydrocarbon solvents. Of these, those which have a boiling point of 50°–300° C., preferably of 100°–220° C. are preferred. Examples of the usable hydrocarbon solvents are saturated hydrocarbons such as hexane, heptane, octane, decane, ligroin, mineral spirit, kerosene, isoparaffin, etc., aromatic hydrocarbons such as benzene, toluene, xylene, etc. Besides, petroleum naphtha, solvent naphtha, petroleum ether, petroleum benzene, decaline, industrial gasoline, ligroin, etc. can be used.

Examples of the usable chlorohydrocarbon solvents are trichloroethane, trichloroethylene, etc. Examples of said silicone solvents are volatile silicone solvents such as dimehteylsiloxane, cyclosilosane, etc. Further dimethylsilicone, phenylsilicone, amino-modified silicone, methylphenylsilicone, etc. can be used. Of said volatile silicone solvents, those having a viscosity of 0.65–50 cps are preferred.

Most preferred are isoparaffin, dimethylsiloxane, trichlorethylene, etc. The solvents can be used singly or as a combination of two or more.

C. Optional Ingredients

The water-repellent glazing agent in accordance with the present invention may contain waxes, lower alcohols, polishing agents, surfactants, etc. as desired. Examples of the usable waxes are vegetable waxes such as carnauba wax, Japan waxes, ouricury wax, esbal wax; animal waxes such as insect waxes, shellac wax, spermacetic wax; petroleum waxes such as paraffin wax, microcrystalline wax, polyethylene wax, ester wax, oxide wax; as well as mineral waxes such as montan wax, ozokerite, celesine, etc. In addition to these waxes, higher aliphatic acid such as palmitic acid, stearic acid, margaric acid, behenic acid; higher alcohols such as palmityl alcohol, stearyl alcohol, behenyl alcohol, margaryl alcohol, myricyl alcohol, eicosanol, etc.; higher aliphatic acid esters such as cetyl palmitate, myricyl palmitate, cetyl stearate, myricyl stearate, etc.; higher amides such as acetamide, propionamide, palmitic acid amide, stearic acid amide, amide wax, etc. and higher amines such as stearylamine, behenylamine. These can be used singly or as a combination of two or more thereof.

Of these, waxes having a melting point of 50°–130° C. when measured using a Yanagimoto MJP-2 melting point tester are most preferred. The waxes used in the present invention should have a particle size of generally 0.1–10 μm, preferably 0.5–2.0 μm when dispersed in the composition, The content of the waxes should be generally 2–20 wt %, preferably 5–15 wt %.

Examples of the above described alcohols are monohydric alcohols such as methyl alcohol, ethyl alcohol, n-propyl alcohol, iso-propyl alcohol, n-butyl alcohol, iso-butyl alcohol, sec-butyl alcohol, tert-butyl alcohol, allyl alcohol, crotyl alcohol, 2-butenol, etc.; dihydric alcohols such as ethylene glycol, propylene glycol, etc.; glycol ethers such as ethylene glycol monomethyl ether, ethylene glycol monobutyl ether, ethylene glycol dimethyl ether, etc.

These alcohols can be used singly or as a combination or two or more. The alcohols are used in a content ratio of usually 1–30 wt %, preferably 1–20 wt %.

Of the surfactants, any of anionic, cationic, nonionic and amphoteric surfactants can be used and there is no restriction as long as they do not impair the object of the present invention.

Examples of the usable anionic surfactants are higher aliphatic acid salts such as aliphatic acid salt, rosin acid soap, N-acylcaboxylic acid salts, ethercarboxylic acid salt, etc.; sulfonic acid salts such as alkylsufonic acid salts, sulfosuccinic acid salts, esterified sulfonic acid salt, alkylbenzensulfonic acid salts, alkylallylsulfonic acid salt, alkylnaphthalenesulfonic acid salts, N-acylsulfonic acid salts; sulfuric acid ester salts such as sulfated oil, sulfuric acid ester salts such as alkyl sulfate salts, alkylallylether sulfate salts, aminosulfuric acid salts, etc.; phosphoric acid ester salts such as alkylphosphate salts, etherphosphoric acid salts, alkyletherphosphoric acid salts, alkylallyletherphosphoric acid satas, amidophosphate salts, etc. and formaldehyde-condensed sulfonic acid salts.

Of these, preferred are alkanol amines and amine salts alkylbenzensulfonic acid, alkanolamines and amine salts of alkylsulfonic acid, metal salts of alkylphophoric acid and metal salts of higher aliphatic acid.

Examples of the usable cationic surfactants are aliphatic amine salts such as primary amine salts, secondary amine salts, tertiary amine salts; quaternary ammonium salts, hidroxyammonium salt, ether ammonium salts and quaterary ammonium salts thereof, etc.; and aromatic quaternary ammonium salts such as benzalconium salt, benzetonium salt, pyridinium salt, imidazolinium salt, etc.

Of these, tertiary amine salts such as diethylamide of stearic acid; quaternary ammonium salts such as stearyltolylmethylammonium chloride; and benzalconium salts such as stearyldimethylbenzylammonium chloride, etc. Examples of the amphoteric surfactants, betaines such as carboxybetaines, sulfobetaines, etc., aminocarboxylic acids, imidazoline derivatives. Of these, imidazoline derivatives are preferred.

Examples of the usable nonionic surfactants are polyoxyethylene alkylethers, polyoxyethylene alkylphenylethers, polyoxyethylene alkyl esters, sorbitane alkylesters, polyoxyethylene sorbitane ester. etc.

Of these, preferred are polyoxyethylenealkylethers, polyoxyethylenealkylphenylethers and polyoxyethylene alkyl esters, When those having a low HLB value of 5–10 is used, W/O (water in oil) type emulsions are formed, which have good water-repellency. When those having a high HLB value of not less than 12 are used, O/W water in oil type emulsions are formed, which have good detergency and wipe-off property although they are rather poor in water repellency.

These surfactants can be used singly or as a combination of two or more thereof The content of these surfactants in the water-repellent glazing agent of the present invention is generally no more than 5.0 wt %, preferably 0.005–2 wt %.

Further, as the above-mentioned polishing agents, diatomaceous earth (kieselguhr), alumina, silica, zirconium oxide, etc. can be used. These polishing agents generally have a particle size of not more than 10 μm, preferably 1–5 μm. The content of the polishing agent is generally 1–20 wt %, preferably 5–10 wt %.

Preparation of the Water-Repellent Glazing Agent

The water-repellent glazing agent of the present invention can be prepared by mixing the above described modified organic silicone oil, a solvent specified above and an optional ingredient or ingredients simultaneously or successively in an arbitrary order. However, it is preferred to mix the modified organic silicone oil and a solvent and then add the optional ingredient or ingredients.

The thus obtained water-repellent glazing agents of the present invention not only exhibits excellent glazing effect for the coated surface of automobiles, the coated surface of various metallic materials, the surface of plastic, rubber, glass, etc. but also is excellent in water-repellency and operability.

SPECIFIC DESCRIPTION OF THE EMBODIMENTS

Now the invention will be described specifically by way of working examples, wherein "%" means "wt %".

EXAMPLE 1

A water-repellent glazing agent was prepared by mixing and stirring the ingredients so as to form the following composition.

| Composition | |
| --- | --- |
| Modified organic silicone oil represented by the above formula, wherein $X^1$ and $X^3$ are $CH_3$, $X^2$ is a $C_{30}$ alkyl group, m is an integer of 24–80 and n is an integer of 3–10 | 5% |
| Isoparaffin | 95% |

In order to test the water-repellency of this composition, the composition was uniformly applied on a 25×50×1.5 mm piece cut out of a coated metal plate for automobiles using tissue paper. After allowed to stand at room temperature for 5 minutes, the applied composition was wiped off with a dry clean piece of gauze and the contact angle was measured using an Elmar goniometer. Also from a coated body plate (pearly metallic black) of a new car ("Laurel" of Nissan Motor Company), a 50×100×1.5 mm piece was cut out and the above-described composition was applied using a sponge in the same manner as usual waxing. After drying the applied composition, the piece was wiped and polished with a clean towel and the surface gloss was measured using a Dr. Lange glossmeter.

The angle of measurement was 60° and the standard value in the measurement was 93.0.

The treated test pieces were soaked in a vessel, into which tap water was continuously flowing in, for one week. After one week, the test pieces were taken out of the water and gloss thereof was measured in the same manner as described above. The results are shown in Table 1. Wipe-off property was evaluated by operability when the composition was applied onto a real automobile body and wiped off with a towel. The rating was as follows:

⊚: Not sticky. Gloss appears by wiping once or twice.

◯: Slightly sticky. Gloss appears by wiping 3-6 times.

Δ: Sticky. Gloss appears by wiping 7-10 times.

×: Considerably sticky. Gloss appears by wiping 10 times or more.

EXAMPLE 2

A water-repellent glazing agent was prepared by repeating procedures of Example 1 using the following composition. The performance was measured and the results are shown in Table 1.

| Composition | |
|---|---|
| Modified organic silicone oil represented by the above formula, wherein $X^1$ and $X^3$ are $CH_3$, $X^2$ is a $C_{30}$ alkyl group and m and n are respectively an integer of 20-80 and 10-30 | 2% |
| Dimethyl silicone (viscosity 1000 cps) | 3% |
| Isoparaffin | 95% |

EXAMPLE 3

A water-repellent glazing agent was prepared by repeating procedures of Example 1 using the following composition. The performance was measured and the results are shown in Table 1.

| Composition | |
|---|---|
| Modified organic silicone oil represented by the above formula, wherein $X^1$ and $X^3$ are $CH_3$, $X^2$ is a $C_{30}$ alkyl group and m and n are respectively an integer of 20-80 and 1-30 | 2% |
| Carnauba wax | 3% |
| Isoparaffin | 92% |

EXAMPLE 4

A water repellent glazing agent was prepared by repeating procedures of Example 1 using the following composition. The performance was meassured and the results are shown in Table 1.

| Composition | |
|---|---|
| Modified organic silicone represented by the above formula, wherein $X^2$ is a $C_{30}$ alkyl group, $X^1$ and $X^3$ are $CH_3$ and m and n are m and n are respectively an interger of 20-80 and 3-10 | 5% |
| Dimethylsiloxane | 95% |

EXAMPLE 5

A water-repellent glazing agent was prepared by repeating procedures of Example 1 using the following composition. The performance was measured and the results are shown in Table 1.

| Composition | |
|---|---|
| Modified organic silicone oil represented by the above formula, wherein $X^2$ is a $C_{30}$ alkyl group, $X^1$ and $X^3$ are $CH_3$ and m and n are respectively an interger of 20-80 and 3-10 | 5% |
| Trichloroethylene | 95% |

EXAMPLE 6

A water-repellent glazing agent was prepared by repeating procedures of Example 1 using the following composition. The performance was measured and the results are shown in Table 1.

| Composition | |
|---|---|
| Modified organic silicone oil represented by the above formula, wherein $X^2$ is a $C_{30}$ alkyl group, $X^1$ and $X^3$ are $CH_3$ and m and n are respectively an interger of 20-80 and 3-10 | 5% |
| Isoparaffin | 49% |
| Surfactant (Neugen EA-80 (HLB:8.8) supplied by Daiichi Kogyo Seiyaku Kabushiki Kaisha) | 1% |
| Water | 45& |

COMPARATIVE EXAMPLE 1

A water-repellent glazing agent was prepared by repeating procedures of Example 1 using the following composition. The performance was measured and the results are shown in Table 1.

| Composition | |
|---|---|
| Carnauba wax | 10% |
| Dimethyl silicone (viscosity 1000 cps) | 10% |
| Kerosene | 80% |

COMPARATIVE EXAMPLE 2

A water-repellent glazing agent was prepared by repeating procedures of Example 1 using the following composition. The performance was measured and the results are shown in Table 1.

| Composition | |
|---|---|
| Carnauba wax | 3% |
| Oleic acid | 1% |
| Dimethyl silicone (viscosity 1000 cps) | 5% |
| Morpholine | 1% |
| Kerosene | 40% |
| Diatomaceous earth | 5% |
| Water | 45% |

COMPARATIVE EXAMPLE 3

A water-repellent glazing agent was prepared by repeating procedures of Example 1 using the following composition. The performance was measured and the results are shown in Table 1.

| Composition | |
|---|---|
| Polyethylene wax | 10.0% |
| Dimethyl silicone oil | 6.0% |
| Amino-modified silicone oil | 2.0% |
| Isoparaffin | 82.0% |

TABLE

| | Repellency | | Glazing (Gloss)[2] | | Wiping[3] | General Eval'tion[4] |
|---|---|---|---|---|---|---|
| | A | B | A | B | | |
| Example | | | | | | |
| 1 | 95° | 93 | 88.0 | 87.9 | ⊚ | ○ |
| 2 | 80° | 70 | 89.2 | 89.1 | ⊚ | ○ |
| 3 | 85° | 80 | 89.0 | 89.0 | ○ | ○ |
| 4 | 95° | 93 | 90.9 | 90.7 | ⊚ | ○ |
| 5 | 95° | 93 | 87.9 | 87.5 | ⊚ | ○ |
| 6 | 75° | 60 | 87.8 | 87.0 | ○ | Δ |
| Comp. Ex. | | | | | | |
| 1 | 70° | 50 | 87.0 | 85.0 | X | X |
| 2 | 50° | 30 | 85.0 | 85.0 | ⊚ | X |
| 3 | 75° | 60 | 82.0 | 82.0 | X | X |

Notes:
1: Contact angle
A: Immediately after application
B: After soaking in water
2: In the non-treated condition, the gloss immediately after application was 85.2 and that after soaking in water was 84.8.
A: Immediately after application.
B: After soaking in water
3. Evaluation
⊚: Not sticky. Gloss appears by wiping once or twice.
○: Slightly sticky. Gloss appears by wiping 3-6 times.
Δ: Considerably sticky. Gloss appears by 7-10 times.
X: Stickly. Gloss appears by wiping 10 times or more
4. Evaluation
○: Excellent in glazing, water repellency and wiping property
Δ: Acceptable as product generally satisfactory in each property
X: Unacceptable as product although satisfactory in some properties Effect of the Invention The water-repellent glazing agent of the present invention exhibits excellent glazing effect, water repellency and that excellent operability.

What we claim is:

1. A water-repellent glazing agent comprising 1-5 wt % of a modified organic silicone oil of the formula:

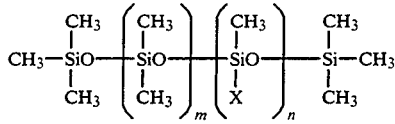

wherein X is a long chain alkyl group having 10-30 carbon atoms, m is an integer of 20-80 and n is an integer of 3-10, and a volatile solvent selected from a group consisting of hydrocarbon solvents, chlorohydrocarbon solvents and silicone solvents.

2. The water-repellent glazing agent as claimed in claim 1, which further contains a wax or waxes selected from vegetable waxes, animal waxes, mineral waxes, higher aliphatic acids, higher alcohols and higher aliphatic acid esters.

3. The water repellent glazing agent as claimed in claim 1, which in the form of emulsion containing a surfactant and water.

4. The water-repellent glazing agent as claimed in claim 3, which in the form of an oil-in-water type emulsion.

5. The water-repellent glazing agent as claimed in claim 3, which is a water-in-oil type emulsion.

6. A water-repellent glazing agent consisting essentially of 1-5 wt % of a modified organic silicone oil of the formula:

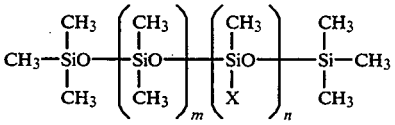

wherein X is a long chain alkyl group having 10-30 carbon atoms, m is an integer of 20-80 and n is an integer of 3-10, and a volatile solvent selected from a group consisting of hydrocarbon solvents, chlorohydrocarbon solvents and silicone solvents.

* * * * *